United States Patent
Wang et al.

(10) Patent No.: US 10,007,122 B2
(45) Date of Patent: Jun. 26, 2018

(54) THREE-DIMENSIONAL DISPLAY SUBSTRATE, ITS MANUFACTURING METHOD AND THREE-DIMENSIONAL DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Qian Wang, Beijing (CN); Xiaochuan Chen, Beijing (CN); Xue Dong, Beijing (CN)

(73) Assignees: BOE TECHNOLOGY GROUP CO., LTD. (CN); BEIJING BOE OPTOELECTRONICS TECHNOLOGY CO., LTD. (CN)

( * ) Notice: Subject to any disclaimer, the term of this patent is extended or adjusted under 35 U.S.C. 154(b) by 9 days.

(21) Appl. No.: 15/308,468

(22) PCT Filed: Oct. 20, 2015

(86) PCT No.: PCT/CN2015/092304
§ 371 (c)(1),
(2) Date: Nov. 2, 2016

(87) PCT Pub. No.: WO2017/000433
PCT Pub. Date: Jan. 5, 2017

(65) Prior Publication Data
US 2017/0261755 A1    Sep. 14, 2017

(30) Foreign Application Priority Data

Jun. 30, 2015  (CN) .......................... 2015 1 0386013

(51) Int. Cl.
*G02B 27/22* (2018.01)
*G02F 1/1335* (2006.01)

(52) U.S. Cl.
CPC ......... *G02B 27/2214* (2013.01); *G02B 27/22* (2013.01); *G02F 1/133514* (2013.01); *G02F 1/133516* (2013.01)

(58) Field of Classification Search
CPC ............... G02B 27/22; G02B 27/2214; G02F 1/133514; G02F 1/133516; G02F 1/133509

(Continued)

(56) References Cited

U.S. PATENT DOCUMENTS

2008/0192356 A1* 8/2008 Hamagishi ......... G02B 27/2214
359/619
2010/0195203 A1* 8/2010 Zuidema ................ G02B 3/005
359/463

(Continued)

FOREIGN PATENT DOCUMENTS

CN      1823292 A    8/2006
CN    101025493 A    8/2007

(Continued)

OTHER PUBLICATIONS

Second Office Action for Chinese Application No. 201510386013.1, dated May 8, 2017, 6 Pages.

(Continued)

*Primary Examiner* — William R Alexander
(74) *Attorney, Agent, or Firm* — Brooks Kushman P.C.

(57) ABSTRACT

The present disclosure provides a 3D display substrate, its manufacturing method and a 3D display device. The 3D display substrate includes a base substrate, a color filter layer arranged on the base substrate, and an optical structure layer arranged on the base substrate and at a light-exiting side of (Continued)

the color filter layer. The optical structure layer includes a first light-transmitting layer and a second light-transmitting layer having different refractive indices. An interface between the first light-transmitting layer and the second light-transmitting layer is of a concave-convex structure, so as to enable one of the first light-transmitting layer and the second light-transmitting layer to form a lens array structure for 3D display.

20 Claims, 4 Drawing Sheets

(58) Field of Classification Search
USPC .................................................. 359/462, 463
See application file for complete search history.

(56) References Cited

U.S. PATENT DOCUMENTS

| | | | |
|---|---|---|---|
| 2011/0075256 A1* | 3/2011 | De Zwart | G02B 27/2214 359/463 |
| 2011/0304909 A1* | 12/2011 | Lu | G02B 27/2214 359/463 |
| 2012/0026161 A1* | 2/2012 | Chen | G02B 5/06 345/419 |
| 2012/0242913 A1* | 9/2012 | Miyazawa | G02B 3/12 349/5 |
| 2012/0320288 A1* | 12/2012 | Baek | G02B 3/14 349/5 |
| 2014/0009704 A1* | 1/2014 | Pijlman | G02B 27/2214 349/15 |
| 2014/0029087 A1* | 1/2014 | Yoon | G02B 27/2214 359/355 |
| 2014/0118823 A1 | 5/2014 | Feng et al. | |
| 2015/0015685 A1* | 1/2015 | Muller | G02B 27/2264 348/55 |
| 2015/0116611 A1 | 4/2015 | Jeong et al. | |
| 2016/0109752 A1* | 4/2016 | Tateno | G02F 1/134336 349/5 |
| 2017/0195580 A1* | 7/2017 | Muller | H04N 5/265 |

FOREIGN PATENT DOCUMENTS

| | | |
|---|---|---|
| CN | 101201498 A | 6/2008 |
| CN | 202443141 U | 9/2012 |
| CN | 202443141 U | 9/2012 |
| CN | 102967893 A | 3/2013 |
| CN | 104423050 A | 3/2015 |
| CN | 104898292 A | 9/2015 |
| JP | 2011128636 A | 6/2011 |
| JP | 2015511730 A | 4/2015 |

OTHER PUBLICATIONS

Chinese First Office Action for Chinese Application No. 201510386013.1, dated Nov. 25, 2016, 7 Pages.
International Search Report and Written Opinion for Application No. PCT/CN2015/092304, dated Feb. 25, 2016, 13 Pages.

* cited by examiner

THREE-DIMENSIONAL DISPLAY SUBSTRATE, ITS MANUFACTURING METHOD AND THREE-DIMENSIONAL DISPLAY DEVICE

CROSS-REFERENCE TO RELATED APPLICATIONS

This application is the U.S. national phase of PCT Application No. PCT/CN2015/092304 filed on Oct. 20, 2015, which claims priority to Chinese Patent Application No. 201510386013.1 filed on Jun. 30, 2015, the disclosures of which are incorporated in their entirety by reference herein.

TECHNICAL FIELD

The present disclosure relates to the field of display technology, in particular to a three-dimensional (3D) display substrate, its manufacturing method and a 3D display device.

BACKGROUND

A 3D display technology has been proposed so as to improve the visual experience. The conventional 3D display technology may include a stereoscopic display technology and an auto-stereoscopic display technology, and the latter may be used without a pair of glasses. Currently, the auto-stereoscopic display technology may be achieved through parallax barrier, lenticular lens or directional backlight.

The lenticular lens technology may also be called as biconvex lens or micro-cylindrical lens 3D technology, and its greatest advantage lies in that the brightness may not be adversely affected. A principle of the lenticular lens technology will be described as follows. Lenticular lenses are arranged in front from a liquid crystal display panel in such a manner that an image plane of the liquid crystal display panel is located in a focal plane of the lenticular lenses, so a pixel of an image under each lenticular lens may be divided into several subpixels, and each subpixel may be projected by each lenticular lens in a respective direction. In this way, it is able for human eyes to view the display panel at different angles, thereby to view different subpixels.

Figure 1:
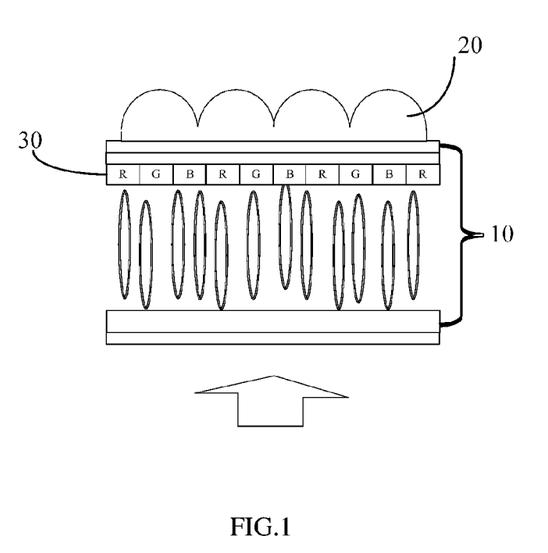
FIG. 1 is a schematic view showing a lenticular lens 3D display device in the related art.

Referring to FIG. 1, which is a schematic view showing a conventional lenticular lens 3D display device, the 3D display device includes a liquid crystal display panel 10 and a lens layer 20 consisting of several lenticular lenses and arranged in front of the liquid crystal display panel 10. Usually, each lenticular lens covers a unit image, and each unit image includes several subpixels 30. A two-dimensional image to be displayed by the display panel consists of several unit images. The image to be display by the display panel is projected by the lens layer 20 to a space in a specific way (e.g., orthogonal projection or perspective projection), so as to reconstruct a 3D scenario. In this way, it is able for the human eyes to achieve a 3D visual effect at a specific viewing position or region through at least such depth cues as binocular parallax and motion parallax.

However, for the conventional lenticular lens 3D display device, the lens layer 20 is separately arranged on the liquid crystal display panel 10 through an attachment process. At this time, the alignment accuracy between the lens layer and the liquid crystal display panel will be adversely affected by the attachment accuracy, and thereby the 3D visual effect will be adversely affected.

SUMMARY

An object of the present disclosure is to provide a 3D display substrate, its manufacturing method and a 3D display device, so as to omit an attachment process for the conventional lens layer and improve both the alignment accuracy and the production efficiency, and reduce the production cost.

In one aspect, the present disclosure provides in some embodiments a 3D display substrate, including: a base substrate; a color filter layer arranged on the base substrate; and an optical structure layer arranged on the base substrate and at a light-exiting side of the color filter layer. The optical structure layer includes a first light-transmitting layer and a second light-transmitting layer having different refractive indices. An interface between the first light-transmitting layer and the second light-transmitting layer is of a concave-convex structure, so as to enable one of the first light-transmitting layer and the second light-transmitting layer to form a lens array structure for 3D display.

Optionally, the optical structure layer and the color filter layer are arranged at an identical side of the base substrate, and the optical structure layer is arranged between the base substrate and the color filter layer.

Optionally, the first light-transmitting layer is arranged adjacent to the color filter layer, and the second light-transmitting layer is arranged at a side of the first light-transmitting layer away from the color filter layer. The first light-transmitting layer has a refractive index greater than a refractive index of the second light-transmitting layer and is provided with a lens array structure protruding toward the base substrate, or the first light-transmitting layer has a refractive index smaller than the second light-transmitting layer which is provided with a lens array substrate protruding toward the color filter layer.

Optionally, the lens array structure includes a plurality of lenticular lens units arranged on the base substrate in a first predetermined direction, and each of the lenticular lens units includes a base portion and a convex lens portion connected to the base portion.

Optionally, in the case that the first light-transmitting layer is provided with the lens array structure protruding toward the base substrate, a focus of each convex lens portion is located in a plane where a light-exiting surface of the color filter layer is located.

Optionally, the color filter layer includes a plurality of color filter units arranged in columns in the first predetermined direction, and each of the lenticular lens units in the first predetermined direction at least corresponds to the color filter units in two adjacent columns.

Optionally, in the case that the first light-transmitting layer is provided with the lens array structure protruding toward the base substrate, a curvature radius r of the convex lens portion of each of the lenticular lens units meets the following formula:

$$r = \frac{t * L * (n_1 - n_2)}{n_2 * e},$$

where t represents a width of each color filter unit in the first predetermined direction, L represents a predetermined distance between eyes of a viewer and the convex lens portion in a second predetermined direction perpendicular to the first predetermined direction, e represents a distance between adjacent parallax points, $n_1$ represents the refractive index of the first light-transmitting layer, and $n_2$ represents the refractive index of the second light-transmitting layer.

Optionally, in the case that the first light-transmitting layer is provided with the lens array structure protruding toward the base substrate and the 3D display substrate has m parallax images, a width p of each of the lenticular lens units in the first predetermined direction meets the following formula:

$$\frac{met}{e+t} - \frac{met^2/w}{e+t} < p < \frac{met}{e+t} + \frac{met^2/w}{e+t},$$

where t represents a width of each color filter unit in the first predetermined direction, L represents a predetermined distance between eyes of a viewer and the convex lens portion in a second predetermined direction perpendicular to the first predetermined direction, e represents a distance between adjacent parallax points, $n_1$ represents the refractive index of the first light-transmitting layer, $n_2$ represents the refractive index of the second light-transmitting layer, and w represents a width of the base substrate in the first predetermined direction.

Optionally, in the case that the first light-transmitting layer is provided with the lens array structure protruding toward the base substrate, a thickness d of each of the lenticular lens units in a second predetermined direction perpendicular to the first predetermined direction meets the following formula:

$$d = \frac{n_1 r}{n_1 - n_2} - \frac{n_1 s}{n_2},$$

wherein $n_1$ represents the refractive index of the first light-transmitting layer, $n_2$ represents the refractive index of the second light-transmitting layer, r represents a curvature radius r of the convex lens portion of each of the lenticular lens units, and s represents a distance between the base portion of each of the lenticular lens units and the light-exiting surface of the color filter layer in the second predetermined direction.

Optionally, the optical structure layer and the color filter layer are arranged two sides of the base substrate respectively, the first light-transmitting layer is arranged adjacent to the color filter substrate layer, the second light-transmitting layer is arranged at a side of the first light-transmitting layer away from the color filter layer, and the second light-transmitting layer has a refractive index greater than a refractive index of air.

In another aspect, the present disclosure provides in some embodiments a 3D display device including the above-mentioned 3D display substrate.

In yet another aspect, the present disclosure provides in some embodiments a method for manufacturing a 3D display substrate, including steps of: providing a base substrate; forming a second light-transmitting layer on the base substrate; forming a first light-transmitting layer on the second light-transmitting layer, the first light-transmitting layer and the second light-transmitting layer being arranged at a light-exiting side of a color filter layer and having different refractive indices, an interface between the first light-transmitting layer and the second light-transmitting layer being of a concave-convex structure, so as to enable one of the first light-transmitting layer and the second light-transmitting layer to form a lens array structure for 3D display; and forming the color filter layer on the base substrate.

Optionally, the step of forming the color filter layer on the base substrate includes forming the color filter layer on the first light-transmitting layer.

Optionally, the step of forming the second light-transmitting layer on the base substrate includes: forming a flat base layer on the base substrate; and forming a concave-convex structure on a surface of the base layer through a patterning process, so as to form the second light-transmitting layer. The step of forming the first light-transmitting layer on the second light-transmitting layer includes forming the first light-transmitting layer on the concave-convex structure of the second light-transmitting layer.

Optionally, the step of forming the concave-convex structure on the surface of the base layer through a patterning process includes forming the concave-convex structure on the surface of the base layer through a grey tone exposure process.

Optionally, the step of forming the concave-convex structure on the surface of the base layer through a grey tone exposure process includes: in the case that the refractive index of the first light-transmitting layer is greater than the refractive index of the second light-transmitting layer, exposing and etching the base substrate on which the base layer is formed through a grey tone mask plate, a plurality of partially transparent regions being formed on the grey tone mask plate in a first predetermined direction, each of the partially transparent regions having a light transmittance which gradually increases from a center to an edge in the first predetermined direction in the case that a positive photoresist is used during the exposing and etching, and which gradually decreases from the center to the edge in the first predetermined direction in the case that a negative photoresist is used during the exposing and etching; and in the case that the refractive index of the first light-transmitting layer is smaller than the refractive index of the second light-transmitting layer, exposing and etching the base substrate on which the base layer is formed through a grey tone mask plate, a plurality of partially transparent regions being formed on the grey tone mask plate in the first predetermined direction, each of the partially transparent regions having a light transmittance which gradually decreases from a center to an edge in the first predetermined direction in the case that the positive photoresist is used during the exposing and etching, and which gradually increases from the center to the edge in the first predetermined direction in the case that the negative photoresist is used during the exposing and etching.

According to the embodiments of the present disclosure, the optical structure for the 3D display is directly formed on the base substrate of the display substrate. As compared with the prior art where the lens layer is attached onto the display panel, it is able to improve both the alignment accuracy and the production efficiency, and reduce the production cost.

DETAILED DESCRIPTION

The present disclosure will be described hereinafter in conjunction with the drawings and embodiments. The following embodiments are for illustrative purposes only, but shall not be used to limit the scope of the present disclosure.

For a 3D display device in the related art, a lens layer consisting of lenticular lenses is attached onto a display panel. At this time, the alignment accuracy between the lens layer and the display panel will be adversely affected by the attachment accuracy. In order to improve the alignment accuracy, the present disclosure provides in some embodiments a 3D display substrate.

Figure 2:
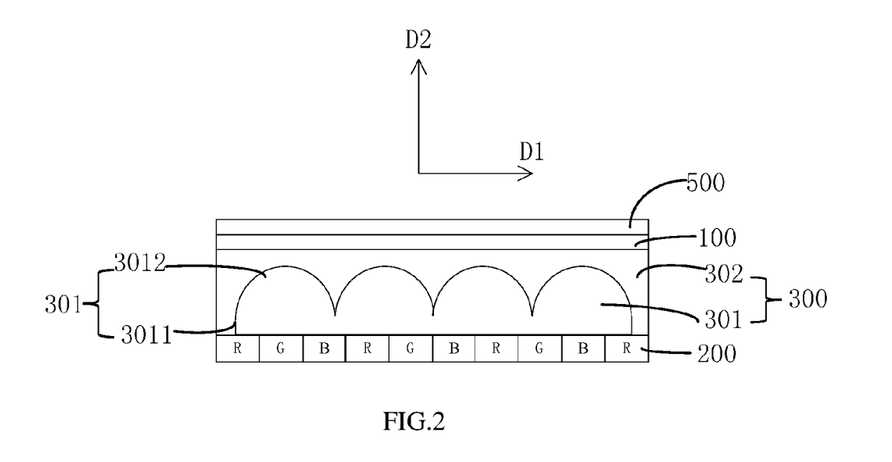
FIG. 2 is a schematic view showing a 3D display substrate according to one embodiment of the present disclosure.

As shown in FIG. 2, the 3D display substrate in the embodiments of the present disclosure includes: a base substrate 100; a color filter layer 200 arranged on the base substrate 100; and an optical structure layer 300 arranged on the base substrate 100 and at a light-exiting side of the color filter layer 200. The optical structure layer 300 includes a first light-transmitting layer 301 and a second light-transmitting layer 302 having different refractive indices. An interface between the first light-transmitting layer 301 and the second light-transmitting layer 302 is of a concave-convex structure, so as to enable one of the first light-transmitting layer 301 and the second light-transmitting layer 302 to form a lens array structure for 3D display.

According to the embodiments of the present disclosure, the optical structure for the 3D display is directly formed on the base substrate 100 of the display substrate. As compared with the related art where the lens layer is attached onto the display panel, it is able to improve both the alignment accuracy and the production efficiency, and reduce the production cost.

It should be appreciated that, the 3D display substrate in the embodiments of the present disclosure may be a color filter substrate of a liquid crystal display panel, or any other display substrate, e.g., an organic light-emitting diode (OLED) display substrate.

The 3D display substrate will be described hereinafter by taking a color filter substrate of a liquid crystal display panel as an example.

Optionally, as shown in FIG. 2, the optical structure layer 300 and the color filter layer 200 are arranged at an identical side of the base substrate 100, and the optical structure layer 300 is arranged between the base substrate 100 and the color filter layer 200.

Figure 3:
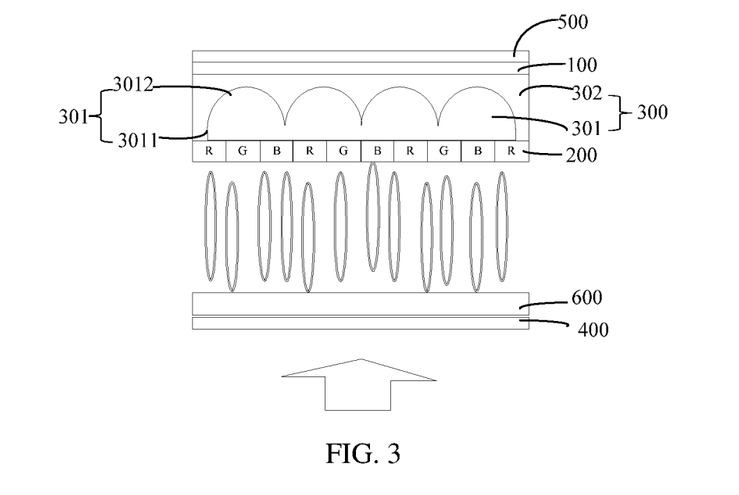
FIG. 3 is a schematic view showing a 3D display device according to one embodiment of the present disclosure.

Here, the optical structure layer 300 is formed on the base substrate 100 and located between the color filter layer 200 and the base substrate 100. As shown in FIGS. 2 and 3, light beams from a backlight source of a display device may pass through a lower polarizer 400 and an array substrate, and then enter a liquid crystal cell. Then, the light beams may pass through the color filter layer 200 on the color filter substrate and reach the lens array structure of the optical structure layer 300. Due to the different refractive indices of the first light-transmitting layer 301 and the second light-transmitting layer 302, the light beams may be refracted at the interface between the first light-transmitting layer 301 and the second light-transmitting layer 302, so as to generate two groups of refracted light beams in different directions. The two groups of refracted light beams may then pass through an upper polarizer 500 on the display substrate, and enter left and right eyes of a viewer and form a left-eye image and a right-eye image respectively. The left-eye image and the right-eye image may be combined in the viewer's brain, so as to form a 3D image.

Figure 8:
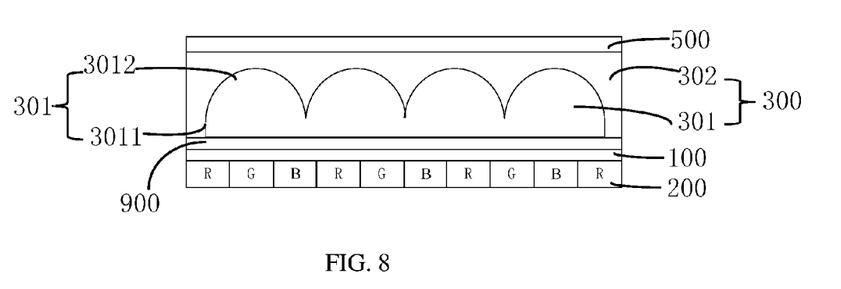
FIG. 8 is another schematic view showing the 3D display substrate according to one embodiment of the present disclosure.

It should be appreciated that, in some other embodiments of the present disclosure, as shown in FIG. 8, the optical structure layer 300 may also be arranged at a side of the base substrate 100 different from another side of the base substrate 100 where the color filter layer 200 is arranged, and the optical structure layer 300 may be arranged at the light-exiting side of the color filter layer 200. In this way, the light beams exiting from the color filter layer 200 may pass through the base substrate 100 and reach the lens array structure of the optical structure layer 300. Then, the light beams may be refracted at the interface between the first light-transmitting layer 301 and the second light-transmitting layer 302, so as to generate two groups of refracted light beams in different directions. The two groups of refracted light beams may then pass through the upper polarizer 500 on the display substrate, and enter the left and right eyes of the viewer and form a left-eye image and a right-eye image respectively, so as to form a 3D image.

Optionally, as shown in FIGS. 2 and 3, the first light-transmitting layer 301 is arranged close to the color filter layer 200, and the second light-transmitting layer 302 is arranged at a side of the first light-transmitting layer 301 away from the color filter layer 200. The first light-transmitting layer 301 has a refractive index greater than a refractive index of the second light-transmitting layer 302 and is provided with a lens array structure protruding toward the base substrate 100, i.e., the first light-transmitting layer 301 is provided with a convex lens array.

In the embodiments of the present disclosure, the lens array structure is formed between the base substrate and the color filter layer, i.e. the lens array structure is arranged inside the cell. In some other embodiments of the present disclosure, the lens array structure may also be arranged at a side of the base substrate different from another side of the base substrate where the color filter layer is arranged, i.e. the lens array structure is arranged outside the cell. As compared with the former, it is necessary for the latter to provide an additional protection layer 900 (as shown in FIG. 8) on the base substrate. However, at this time, an additional process is required, and a thickness of the display substrate will increase.

In addition, in the embodiments of the present disclosure, the first light-transmitting layer 301 is of the lens array structure, and it has the refractive index greater than a refractive index of the second light-transmitting layer 302, so the light beams from the color filter layer may be split into two groups of light beams due to convex lenses at the interface between the first light-transmitting layer 301 and the second light-transmitting layer 302, thereby to achieve the 3D display.

It should be appreciated that, in some other embodiments of the present disclosure, any other lens array structure may be formed on the basis of the refractive indices of the first light-transmitting layer 301 and the second light-transmitting layer 302, so as to achieve the 3D display. For example, in the case that the refractive index of the first light-transmitting layer 301 is smaller than that of the second light-transmitting layer 302, the second light-transmitting layer 302 is provided with the lens array structure protruding toward the color filter layer 200, i.e., the first light-transmitting layer 301 is provided with a concave lens array structure depressed toward the color filter layer 200. At this time, the light beams from the color filter layer 200 may be split into two groups of light beams due to concave lenses at the interface between the first light-transmitting layer 301 and the second light-transmitting layer 302, so as to achieve the 3D display.

Optionally, as shown in FIG. 2, the lens array structure includes a plurality of lenticular lens units arranged on the base substrate 100 in a first predetermined direction D1, and each of the lenticular lens units includes a base portion 3011 and a convex lens portion 3012 connected to the base portion.

In the embodiments of the present disclosure, the lens array structure consists of a plurality of lenticular lens units. However, in some other embodiments of the present disclosure, the lens array structure may alternatively include any other lens arrays, which are not particularly defined herein.

Optionally, in the case that the first light-transmitting layer 301 is provided with the lens array structure protruding toward the base substrate 100, a focus of each convex lens portion 3012 of each lenticular lens unit is located in a plane where a light-exiting surface of the color filter layer 200 is located, so as to achieve the 3D display in a better manner. In addition, it is able to facilitate the calculation of parameters of the lens array structure, so as to acquire a better display effect.

Figure 4:
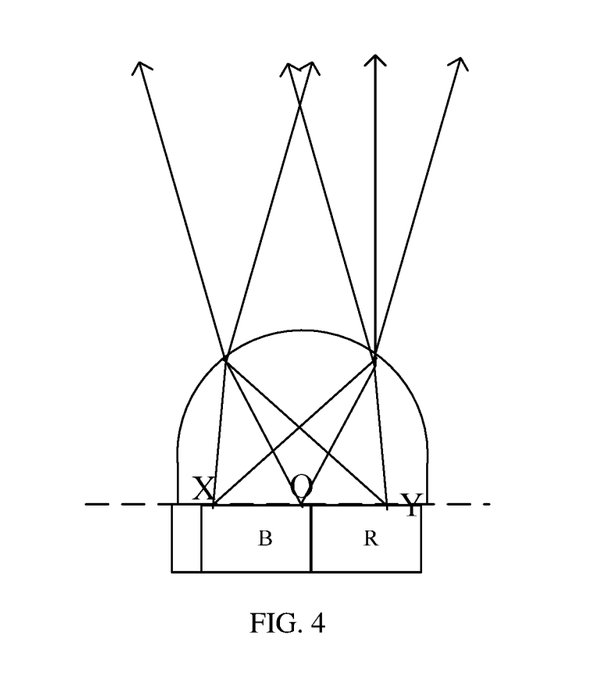
FIG. 4 is a schematic view showing a beam splitting state of a lenticular lens unit.
Figure 5:
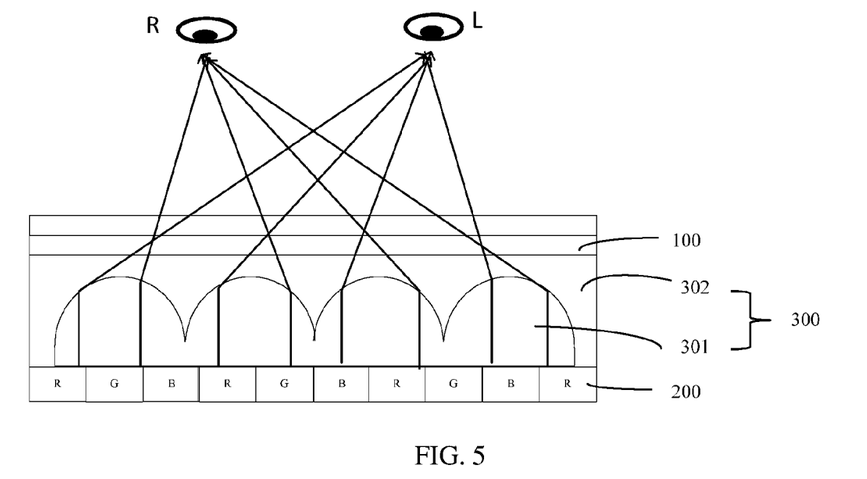
FIG. 5 is a schematic view showing a principle of the 3D display substrate for 3D display according to one embodiment of the present disclosure.

As shown in FIG. 4, which is a schematic view showing a beam splitting principle of the lenticular lens unit, the color filter layer 200 is located in a plane (a focal plane) where the focus of the convex lens portion 3012 of the lenticular lens unit is located. The light beams passing through the focus O of the convex lens portion 3012 of one lenticular lens unit are refracted by the lenticular lens unit into two parallel light beams, the light beams passing through a point Y at one side of the focus O are refracted by the lenticular lens unit into two parallel light beams, and the light beams passing through a point X at the other side of the focus O are refracted by the lenticular lens unit into two parallel light beams. As shown in FIG. 5, due to the beam splitting function of the lenticular lens units, it is able for the human eyes to achieve a stereo image through the 3D display substrate.

Optionally, as shown in FIGS. 2 and 3, the color filter layer includes a plurality of color filter units arranged in columns in the first predetermined direction D1, and each of the lenticular lens units in the first predetermined direction at least corresponds to the color filter units in two adjacent columns.

In the embodiments of the present disclosure, two columns or more, rather than an identical column, of the color filter units may be viewed by the user at a left-eye viewing region and a right-eye viewing region in a second predetermined direction D2 perpendicular to the first predetermined direction D1, so an color filter units arranged in different columns may be combined at both the left-eye viewing region and the right-eye viewing region. As a result, it is able to achieve a virtual display effect, thereby to improve the display quality of the 3D display device.

In the case that the first light-transmitting layer 301 is provided with the lens array structure protruding toward the base substrate 100, optimal design parameters of the lens array structure will be described hereinafter.

Figure 6:
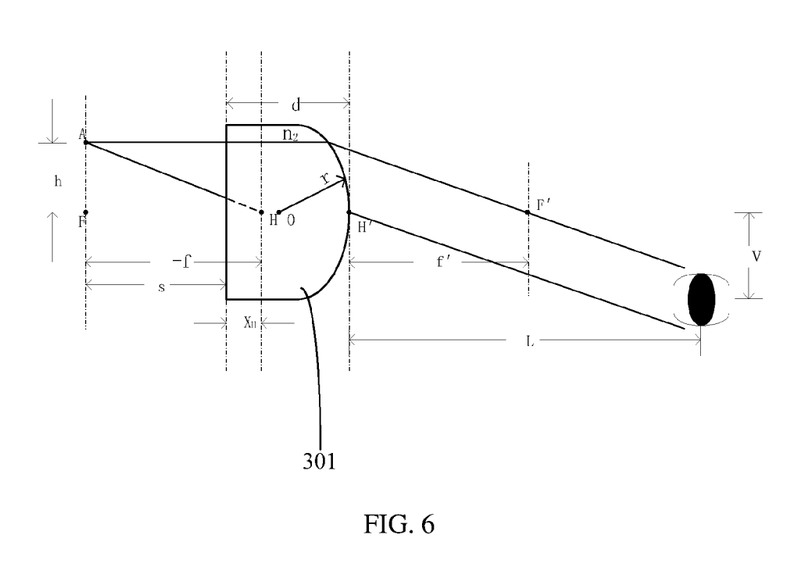
FIG. 6 is a schematic view showing light paths for the lenticular lens unit.

FIG. 6 is a schematic view showing light paths of the lenticular lens unit. F and F' are object focus and image focus of the lenticular lens unit respectively, H and H' are an object principal point and an image principal point of the lenticular lens unit, $n_1$ is a refractive index of the lenticular lens unit (i.e., the first light-transmitting layer 301), and $n_2$ is a refractive index of a media (i.e., the second light-transmitting layer 302) where the lenticular lens unit is located.

According to a basic principle of geometrical optics, a focal length of the lenticular lens unit may be calculated using the following formula:

$$f' = -f = \frac{n_1}{n_1 - n_2} r. \tag{1}$$

A distance between the object principal point H and a flat rear surface of the base portion of the lenticular lens unit may be calculated using the following formula:

$$x_H = \frac{n_2}{n_1} d, \tag{2}$$

where d represent a thickness of the lenticular lens unit in the second predetermined direction, and r represents a curvature radius r of the convex lens portion of the lenticular lens unit.

Because the light beam will maintain its propagation direction after it passes through the object-image principal point, an angle of an incident light beam relative to an optical axis is equal to an angle of an emergent light beam relative to the optical axis. At this time:

$$\frac{h}{f'} = \frac{v}{l}.$$

After conversion, the following formula will be acquired:

$$h = \frac{f'v}{l}. \tag{3}$$

Figure 7:
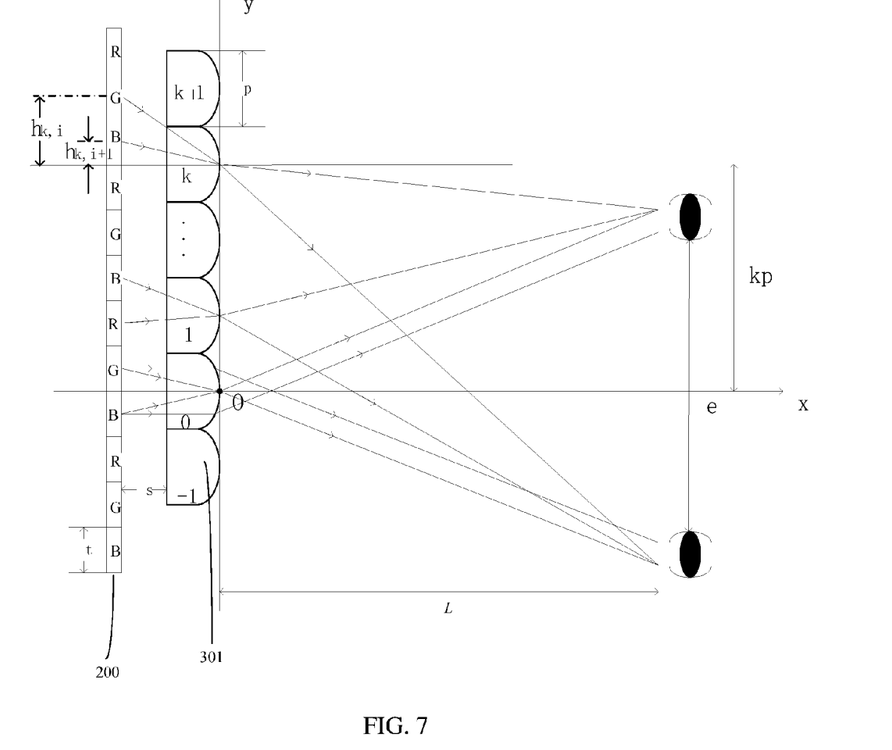
FIG. 7 is a schematic view showing a beam splitting principle of the lenticular lens unit.

FIG. 7 is a schematic view showing a beam splitting principle of the lenticular lens unit. A light-exiting surface of the color filter layer 200 is located in a plane where the object focuses of the lenticular lens units are located. A coordinate system as shown in FIG. 7 is established, where a coordinate origin is an apex of a central lenticular lens unit having a serial number of 0 in the lens array structure, an X axis coincides with an optical axis of the lenticular lens unit having a serial number of 0, and a Y axis is parallel to a plane where the light-exiting surface of the color filter layer 200 is located. In a positive direction of the Y axis, the lenticular lens units are numbered 1, 2, . . . , k, . . . , and in a negative direction, the lenticular lens units are numbered −1, −2, . . . , −k, . . . .

Usually, the display panel is located in the middle of a viewing field of the viewer, so parallax points of parallax images are designed to be symmetrical with each other relative to the X axis. In the case that m parallax images are used by the 3D display device, an optimal parallax point of an $i^{th}$ parallax image is (L, [i−(m+1)/2]e), where i=1, 2, 3, . . . , and m, L represents a predetermined distance between the eyes of the viewer and the convex lens portion 3012 in the second predetermined direction perpendicular to the first predetermined direction (i.e., a distance of distinct vision), and e represents a distance between the adjacent parallax points. In the case that m=2, e is just a predetermined distance between the left and right eyes of the viewer, i.e., an interpupillary distance of the viewer.

In FIG. 7, m=2, so in the case that a first parallax image (i=L) is viewed, coordinates of its parallax point are (L, −e/2), and in the case that a second parallax image (i=2) is viewed, coordinates of its parallax point are (L, −e/2). According to formula (3), it is able to acquire heights $h_{k,i}$ and $h_{k,i+1}$ of points, viewed by the eyes at the parallax points of the $i^{th}$ and $(i+1)^{th}$ parallax images through a $k^{th}$ lenticular lens unit, relative to the optical axis of the lenticular lens unit through the following formulae respectively:

$$h_{k,i} = f' \frac{kp - [i - (m+1)/2]e}{L}, \quad (4)$$

$$h_{k,i+1} = f' \frac{kp - [(i+1) - (m+1)/2]e}{L}. \quad (5)$$

Then, it is able to acquire the following formula:

$$t = h_{k,i} - h_{k,i+1} \quad (6),$$

where t represents a width of each color filter unit in the first predetermined direction.

On the basis of formulae (1), (4), (5) and (6), it is able to acquire the curvature radius r of the convex lens portion 3012 of the lenticular lens unit through the following formula:

$$r = \frac{t * L * (n_1 - n_2)}{n_2 * e}. \quad (7)$$

In addition, an object point of the $i^{th}$ parallax image viewed by the eyes of the viewer through the $k^{th}$ lenticular lens unit shall fall within a viewing field of this parallel image, i.e., there is the following formula:

$$mkt + \left(\frac{m}{2} - i\right)t < kp + h_{k,i} < mkt + \left(\frac{m}{2} - i + 1\right)t. \quad (8)$$

Through substituting formulae (1), (4) and (6) into formula (8), it is able to acquire the following formula:

$$\frac{met}{e+t} - \frac{et}{2k(e+t)} < p < \frac{met}{e+t} + \frac{et}{2k(e+t)}. \quad (9)$$

It is assumed that w represents a width of the base substrate 100 in the first predetermined direction (i.e., a width of a display device), and at this time:

w=2kmt.

After conversion, it is able to acquire the following formula:

$$2k = \frac{w}{mt}. \quad (10)$$

Through substituting formula (10) into formula (9), it is able to determine that the width p of each of the lenticular lens units in the first predetermined direction meets the following formula:

$$\frac{met}{e+t} - \frac{met^2/w}{e+t} < p < \frac{met}{e+t} + \frac{met^2/w}{e+t}, \quad (11)$$

where k=1, 2, 3, . . . .

Obviously, w is far greater than e and t, so a suitable value of the width p (pitch) of each of the lenticular lens units in the first predetermined direction may be calculated using the following formula:

$$p = \frac{met}{e+t}. \quad (12)$$

At this time, an allowable spanning range for the width p of each of the lenticular lens units in the first predetermined direction is $$\frac{met^2/w}{e+t}.$$

For example, in FIG. 7, the number m of the parallax images is 2, so the width p of each of the lenticular lens units in the first predetermined direction may be calculated using the following formula:

$$p = \frac{2et}{e+t}.$$

It is assumed that s represents a distance between the base portion of each of the lenticular lens units and the light-exiting surface of the color filter layer 200 in the second predetermined direction, and as shown in FIG. 6, it is able to acquire the following formula:

f'=s+x_H (13).

Through substituting formulae (1) and (2) into formula (13), it is able to acquire a thickness d of the lenticular lens unit using the following formula:

$$d = \frac{n_1 r}{n_1 - n_2} - \frac{n_1 s}{n_2}. \quad (14)$$

In a word, it is able to acquire the desired lenticular lens unit by determining the curvature radius r of the convex lens portion 3012 of the lenticular lens unit through formula (7), determining the width p of the lenticular lens unit in the first predetermined direction through formula (11) and determining the thickness d of the lenticular lens unit in the second predetermined direction through formula (14).

In addition, it should be appreciated that, in the embodiments of the present disclosure, the first light-transmitting layer 301 may be made of photosensitive resin material having a high refractive index, e.g., the resin material with a product model ID of FHR-09A having a refractive index of 1.8 from Fuji Company, or a composite film having a refractive index of 2.05 and modified with glycidyl methacrylate, or a titanium alkoxide/epoxy resin/titanium dioxide (TiO$_2$) composite film having a refractive index of 1.972 and obtained by introducing prepared TiO$_2$ nanoparticles (NPs) at different contents into titanium alkoxide or epoxy resin. The second light-transmitting layer 302 may be a flat layer made of a resin material.

The present disclosure further provides in some embodiments a 3D display device. As shown in FIG. 3, the 3D display device includes the above-mentioned 3D display substrate and another substrate 600 arranged opposite to the 3D display substrate. The 3D display substrate may be a color filter substrate, and correspondingly the other substrate may be an array substrate. The 3D display device may be a display panel, a mobile phone, a liquid crystal display or etc.

The present disclosure further provides in some embodiments a method for manufacturing the above-mentioned 3D display substrate, which includes steps of: providing the base substrate 100; forming a color filter layer 200 on the base substrate 100; forming the second light-transmitting layer 302 on the base substrate 100; forming the first light-transmitting layer 301 on the second light-transmitting layer 302, the first light-transmitting layer 301 and the second light-transmitting layer 302 being arranged at the light-exiting side of the color filter layer 200 and having different refractive indices, an interface between the first light-transmitting layer 301 and the second light-transmitting layer 302 being of a concave-convex structure, so as to enable one of the first light-transmitting layer 301 and the second light-transmitting layer 302 to form the lens array structure for 3D display.

According to the embodiments of the present disclosure, the optical structure for the 3D display is directly formed on the base substrate 100 of the display substrate. As compared with the related art where the lens layer is attached onto the display panel, it is able to improve both the alignment accuracy and the production efficiency, and reduce the production cost.

The method for manufacturing the 3D display substrate will be described hereinafter in more details.

In an embodiment of the present disclosure, the method includes steps of: forming the second light-transmitting layer 302 on the base substrate 100; forming the first light-transmitting layer 301 on the second light-transmitting layer 302; and forming the color filter layer 200 on the first light-transmitting layer 301.

In the embodiments of the present disclosure, the first light-transmitting layer 301 and the second light-transmitting layer 302 may be directly formed on the base substrate 100 prior to the formation of the color filter layer 200 of the color filter substrate. As compared with the related art where the lens layer is attached onto the base substrate, this procedure is simple, so it is able to improve the production efficiency and reduce the production cost.

Optionally, the method further includes: forming a flat base layer on the base substrate 100 through a process such as deposition, coating or sputtering; forming the concave-convex structure on a surface of the base layer through a patterning process, so as to form the second light-transmitting layer 302; and forming the first light-transmitting layer 301 on the concave-convex structure of the second light-transmitting layer 302.

In the embodiments of the present disclosure, the concave-convex structure of the second light-transmitting layer may be formed by a patterning process such as etching. Of course, it should be appreciated that, during the actual application, the concave-convex structure may also be formed through any other patterning process. The patterning process typically includes a photoresist coating process, an exposing process, a developing process, an etching process and a photoresist removing process.

In the embodiments of the present disclosure, the flat base layer may be formed on the base substrate 100, and then the concave-convex structure may be etched on the base layer, so as to form the optical structure layer 300 in a simple manner. Of course, it should be appreciated that, in some other embodiments of the present disclosure, the first light-transmitting layer 301 and the second light-transmitting layer 302 may also be formed on the base substrate 100 in any other ways, which are not particularly defined herein.

Optionally, the flat base layer may be formed on the base substrate 100 through spin coating. To be specific, it may include: dripping a raw material for forming the base layer onto the base substrate 100; dripping a spinning agent onto a surface of the raw material, and spinning the raw material to form a flat layer; and volatilizing a solvent in the flat layer, so as to form the base layer.

Through the spin coating process, it is able to form the base layer evenly in a simple manner, so as to facilitate the propagation of the light beams.

Optionally, the concave-convex structure may be formed on the surface of the base layer through a grey tone exposure process. To be specific, it may include: in the case that the refractive index of the first light-transmitting layer is greater than the refractive index of the second light-transmitting layer, exposing and etching the base substrate on which the base layer is formed through a grey tone mask plate, a plurality of partially transparent regions being formed on the grey tone mask plate in a first predetermined direction, each of the partially transparent regions having a light transmittance which gradually increases from a center to an edge in the first predetermined direction in the case that a positive photoresist is used during the exposing and etching, and which gradually decreases from the center to the edge in the first predetermined direction in the case that a negative photoresist is used during the exposing and etching.

In the embodiments of the present disclosure, the light transmittance of each partially transparent region gradually increases from the center to the edge in the first predetermined direction. The mask plate may have different thicknesses at different regions, so as to provide different light transmittances and control an exposure degree. The larger the thickness, the smaller the exposure degree. Through the gradually-varied thickness of the partially transparent region, it is able to form an arched convex lens on the base layer, i.e., to form the concave-convex structure at the interface between the second light-transmitting layer 302 and the first light-transmitting layer 301, thereby to form the convex lens array structure. As a result, it is able to provide the first light-transmitting layer 301 with the lens array structure protruding toward the base substrate 100.

In some other embodiments of the present disclosure, in the case that the refractive index of the first light-transmitting layer 301 is smaller than the refractive index of the second light-transmitting layer 301, the base substrate on which the base layer is formed may be exposed and etched through a grey tone mask plate. A plurality of partially transparent regions is formed on the grey tone mask plate in the first predetermined direction. Each of the partially transparent regions has a light transmittance which gradually decreases from a center to an edge in the first predetermined direction in the case that the positive photoresist is used during the exposing and etching, and which gradually increases from the center to the edge in the first predetermined direction in the case that the negative photoresist is used during the exposing and etching.

In this way, it is able to provide the second light-transmitting layer 302 with the lens array structure protruding toward the color filter layer 200.

In the above embodiments of the present disclosure, the lens array structure may be directly formed on the base substrate 100 of the color filter substrate using a resin material through a spin coating process and a grey tone exposure process, so as to improve the alignment accuracy. In addition, as compared with the related art where the alignment accuracy at a millimeter level is achieved by an attachment process, the alignment accuracy at a micrometer level may be achieved by the spin coating process in conjunction with the grey tone exposure process in the present disclosure, so it is able to improve the display effect. Further, through the formation of the optical structure for the 3D display directly on the color filter substrate, it is able to improve the production efficiency and reduce the production cost.

It should be appreciated that, in some other embodiments of the present disclosure, the optical structure layer may also be directly formed on the base substrate 100 through any other processes, which are not particularly defined herein.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A three-dimensional (3D) display substrate, comprising:
   a base substrate;
   a color filter layer arranged on the base substrate; and
   an optical structure layer arranged on the base substrate and at a light-exiting side of the color filter layer,
   wherein the optical structure layer comprises a first light-transmitting layer and a second light-transmitting layer having different refractive indices, and an interface between the first light-transmitting layer and the second light-transmitting layer is of a concave-convex structure, enabling one of the first light-transmitting layer and the second light-transmitting layer to form a lens array structure for 3D display, wherein the refractive index of the first light-transmitting layer is smaller than the refractive index of the second light-transmitting layer, and the second light-transmitting layer is provided with a lens array substrate protruding toward the color filter layer.

2. The 3D display substrate according to claim 1, wherein the optical structure layer and the color filter layer are arranged at an identical side of the base substrate, and the optical structure layer is arranged between the base substrate and the color filter layer.

3. The 3D display substrate according to claim 1, wherein the first light-transmitting layer is arranged adjacent to the color filter layer, and the second light-transmitting layer is arranged at a side of the first light-transmitting layer away from the color filter layer.

4. The 3D display substrate according to claim 1, wherein the lens array structure comprises a plurality of lenticular lens units arranged on the base substrate in a first predetermined direction, and each of the lenticular lens units comprises a base portion and a convex lens portion connected to the base portion.

5. The 3D display substrate according to claim 4, wherein in the case that the first light-transmitting layer is provided with the lens array structure protruding toward the base substrate, a focus of each convex lens portion is located in a plane where a light-exiting surface of the color filter layer is located.

6. The 3D display substrate according to claim 4, wherein the color filter layer comprises a plurality of color filter units arranged in columns in the first predetermined direction, and each of the lenticular lens units in the first predetermined direction at least corresponds to the color filter units in two adjacent columns.

7. The 3D display substrate according to claim 4, wherein in the case that the first light-transmitting layer is provided with the lens array structure protruding toward the base substrate, a curvature radius r of the convex lens portion of each of the lenticular lens units meets the following formula:

$$r = \frac{t * L * (n_1 - n_2)}{n_2 * e},$$

where t represents a width of each color filter unit in the first predetermined direction, L represents a predetermined distance between eyes of a viewer and the convex lens portion in a second predetermined direction perpendicular to the first predetermined direction, e represents a distance between adjacent parallax points, $n_1$ represents the refractive index of the first light-transmitting layer, and $n_2$ represents the refractive index of the second light-transmitting layer.

8. The 3D display substrate according to claim 4, wherein in the case that the first light-transmitting layer is provided with the lens array structure protruding toward the base substrate and the 3D display substrate has m parallax images, a width p of each of the lenticular lens units in the first predetermined direction meets the following formula:

$$\frac{met}{e+t} - \frac{met^2/w}{e+t} < p < \frac{met}{e+t} + \frac{met^2/w}{e+t},$$

where t represents a width of each color filter unit in the first predetermined direction, L represents a predetermined distance between eyes of a viewer and the convex lens portion in a second predetermined direction perpendicular to the first predetermined direction, e represents a distance between adjacent parallax points, $n_1$ represents the refractive index of the first light-transmitting layer, $n_2$ represents the refractive index of the second light-transmitting layer, and w represents a width of the base substrate in the first predetermined direction.

9. The 3D display substrate according to claim 4, wherein in the case that the first light-transmitting layer is provided with the lens array structure protruding toward the base substrate, a thickness d of each of the lenticular lens units in a second predetermined direction perpendicular to the first predetermined direction meets the following formula:

$$d = \frac{n_1 r}{n_1 - n_2} - \frac{n_1 s}{n_2},$$

wherein $n_1$ represents the refractive index of the first light-transmitting layer, $n_2$ represents the refractive index of the second light-transmitting layer, r represents a curvature radius of the convex lens portion of each of the lenticular lens units, and s represents a distance between the base portion of each of the lenticular lens units and a light-exiting surface of the color filter layer in the second predetermined direction.

10. The 3D display substrate according to claim 1, wherein the optical structure layer and the color filter layer are arranged two sides of the base substrate respectively, the first light-transmitting layer is arranged adjacent to the color filter substrate layer, the second light-transmitting layer is arranged at a side of the first light-transmitting layer away from the color filter layer, and the second light-transmitting layer has a refractive index greater than a refractive index of air.

11. A 3D display device comprising the 3D display substrate according to claim 1.

12. A method for manufacturing a 3D display substrate, comprising:
providing a base substrate;
forming a second light-transmitting layer on the base substrate;
forming a first light-transmitting layer on the second light-transmitting layer, the first light-transmitting layer and the second light-transmitting layer being arranged at a light-exiting side of a color filter layer and having different refractive indices, an interface between the first light-transmitting layer and the second light-transmitting layer being of a concave-convex structure, enabling one of the first light-transmitting layer and the second light-transmitting layer to form a lens array structure for 3D display, wherein the refractive index of the first light-transmitting layer is smaller than the refractive index of the second light-transmitting layer, and the second light-transmitting layer is provided with a lens array substrate protruding toward the color filter layer; and
forming the color filter layer on the base substrate.

13. The method according to claim 12, wherein forming the color filter layer on the base substrate comprises: forming the color filter layer on the first light-transmitting layer.

14. The method according to claim 13, wherein
forming the second light-transmitting layer on the base substrate comprises: forming a flat base layer on the base substrate, and forming a concave-convex structure on a surface of the base layer through a patterning process to form the second light-transmitting layer; and
forming the first light-transmitting layer on the second light-transmitting layer comprises: forming the first light-transmitting layer on the concave-convex structure of the second light-transmitting layer.

15. The method according to claim 14, wherein forming the concave-convex structure on the surface of the base layer through the patterning process comprises: forming the concave-convex structure on the surface of the base layer through a grey tone exposure process.

16. The method according to claim 15, wherein the step of forming the concave-convex structure on the surface of the base layer through the grey tone exposure process comprises:
exposing and etching the base substrate on which the base layer is formed through a grey tone mask plate, a plurality of partially transparent regions being formed on the grey tone mask plate in a first predetermined direction, wherein a light transmittance of each of the partially transparent regions gradually decreases from a center to an edge in the first predetermined direction in the case that a positive photoresist is used during the exposing and etching, and the light transmittance of each of the partially transparent regions gradually increases from the center to the edge in the first predetermined direction in the case that a negative photoresist is used during the exposing and etching.

17. The 3D display substrate according to claim 2, wherein the lens array structure comprises a plurality of lenticular lens units arranged on the base substrate in a first predetermined direction, and each of the lenticular lens units comprises a base portion and a convex lens portion connected to the base portion.

18. The 3D display substrate according to claim 17, wherein in the case that the first light-transmitting layer is provided with the lens array structure protruding toward the base substrate, a focus of each convex lens portion is located in a plane where a light-exiting surface of the color filter layer is located.

19. The 3D display substrate according to claim 17, wherein the color filter layer comprises a plurality of color filter units arranged in columns in the first predetermined direction, and each of the lenticular lens units in the first predetermined direction at least corresponds to the color filter units in two adjacent columns.

20. The 3D display substrate according to claim 17, wherein in the case that the first light-transmitting layer is provided with the lens array structure protruding toward the base substrate, a curvature radius r of the convex lens portion of each of the lenticular lens units meets the following formula:

$$r = \frac{t * L * (n_1 - n_2)}{n_2 * e},$$

where t represents a width of each color filter unit in the first predetermined direction, L represents a predetermined distance between eyes of a viewer and the convex lens portion in a second predetermined direction perpendicular to the first predetermined direction, e represents a distance between adjacent parallax points, $n_1$ represents the refractive index of the first light-transmitting layer, and $n_2$ represents the refractive index of the second light-transmitting layer.

* * * * *